(12) United States Patent
Schibsbye et al.

(10) Patent No.: US 8,641,339 B2
(45) Date of Patent: Feb. 4, 2014

(54) APPARATUS FOR RAILROAD TRANSPORTATION OF WIND TURBINE BLADES

(75) Inventors: Karsten Schibsbye, Boulder, CO (US); John T. Sullivan, Longwood, FL (US)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/531,805

(22) Filed: Jun. 25, 2012

(65) Prior Publication Data

US 2013/0343827 A1    Dec. 26, 2013

(51) Int. Cl.
*B60P 3/40* (2006.01)

(52) U.S. Cl.
USPC ............................................ 410/45

(58) Field of Classification Search
USPC ............ 410/45, 32–35, 44, 53; 105/396, 404, 105/407, 411; 220/1.5
See application file for complete search history.

(56) References Cited

U.S. PATENT DOCUMENTS

| 7,591,621 B1 | 9/2009 | Landrum et al. |
| 7,690,875 B2 | 4/2010 | Grabau |
| 8,096,739 B1 * | 1/2012 | Landrum et al. ................ 410/45 |
| 8,192,117 B1 * | 6/2012 | Landrum et al. ................ 410/45 |
| 8,382,407 B1 * | 2/2013 | Landrum et al. ................ 410/45 |

* cited by examiner

*Primary Examiner* — H Gutman

(57) ABSTRACT

An apparatus (100) for transporting a wind turbine blade (10) on at least two railcars over a railway is provided. The apparatus includes a root end support (22) for supporting the root end (12) of the blade, a mid span support (28) for supporting the mid span (14) of the blade, and a tip displacement limiter (24) for restricting a tip end (16) of the blade from extending beyond a lateral transportation limit (30) imposed by the railroad. The tip displacement limiter exerts a force on the blade which is counter to a force exerted on the blade by the mid span support only when the railcars navigate a design basis curve (32) in the railway to cause a bending of the blade in order to avoid exceeding the lateral transportation limit. The apparatus is particularly useful for the transportation of extra-long or curved wind turbine blades.

17 Claims, 2 Drawing Sheets

APPARATUS FOR RAILROAD TRANSPORTATION OF WIND TURBINE BLADES

FIELD OF THE INVENTION

The present invention relates to transporting wind turbine blades. More specifically, the present invention relates to an apparatus for transporting long and/or curved wind turbine blades via railroad without exceeding a lateral transportation limit as the blade is transported around a curve in the rail line.

BACKGROUND OF THE INVENTION

The individual components of a wind turbine are often manufactured at different geographic locations. Therefore, transportation of each of the components to a location for assembly is necessary. Wind turbine blades are often required to be transported by railcar from one point to another, and must be protected and properly handled during transportation. The length of many wind turbine blades requires them to be supported by two coupled railcars. During transportation around a bend in the railroad, the blade remains straight and projects over the side of the railcar. U.S. Pat. No. 7,591,621 issued to Landrum et al. addresses this issue as illustrated by FIG. 1 herein which is taken from FIG. 3 of that prior art patent.

FIG. 1 provides a top plan view of a blade 1 loaded onto two railcars 2, 3 and rounding a curve in a railroad 4. The prior art apparatus of FIG. 1 provides a blade root end support 5 and a sliding mid-span support 6 to provide vertical support for the blade 1. As the railcars 2, 3 enter the curve, the blade tip end 7 begins to extend beyond the side of the second railcar 3 until the blade 1 makes contact with a lateral guide structure 8. As the curve increases, the mid-span support is thus caused to slide laterally to at least partially limit the lateral overhang of the blade tip 11 as the railcars 2,3 round the curve. Note that blade 1 is a straight blade and that it remains straight as it is transported around the curve.

BRIEF DESCRIPTION OF THE DRAWINGS

The invention is explained in the following description in view of the drawings that show.

DETAILED DESCRIPTION OF THE INVENTION

The evolution of technology and the economics of scale have lead to the development of large-scale wind turbines with larger proportions. There is a direct relationship between increased turbine blade length and an increase in the power generation capacity of a wind turbine. Additionally, curved wind turbine blades are being used more routinely. Such blades are curved in their resting state in a direction which is counter to the natural bending that occurs during operation of the blade.

Due to the extended lengths of the blades and/or curvature in their shape, the present inventors have found that prior art transportation solutions are limiting. Many railways allow for transportation at different speeds depending on the amount of overhang of the blade over the side of the railcar. For example, a railcar transporting a blade with a significant amount of overhang may have to travel at a slower speed than a railcar transporting a blade with little overhang. Due to the increase in length of blades over time, the inventor's have found that the solution found in U.S. Pat. No. 7,591,621 results in the need to slow the speed of the railcars when traversing curves in the rail transportation route due to the increased projection of the blade beyond the side of the rail car as the blade length increases. The current typical wind turbine blade length may be between 45-60 meters (approximately 150-200 feet) long, and even longer blades may be developed in the foreseeable future. The present invention addresses the limitations of the prior art and allows for rail transportation of very long and curved blades around design basis curves in a railroad without violating the lateral transportation limits set by railroads for full speed movement of the train.

Figure 1:
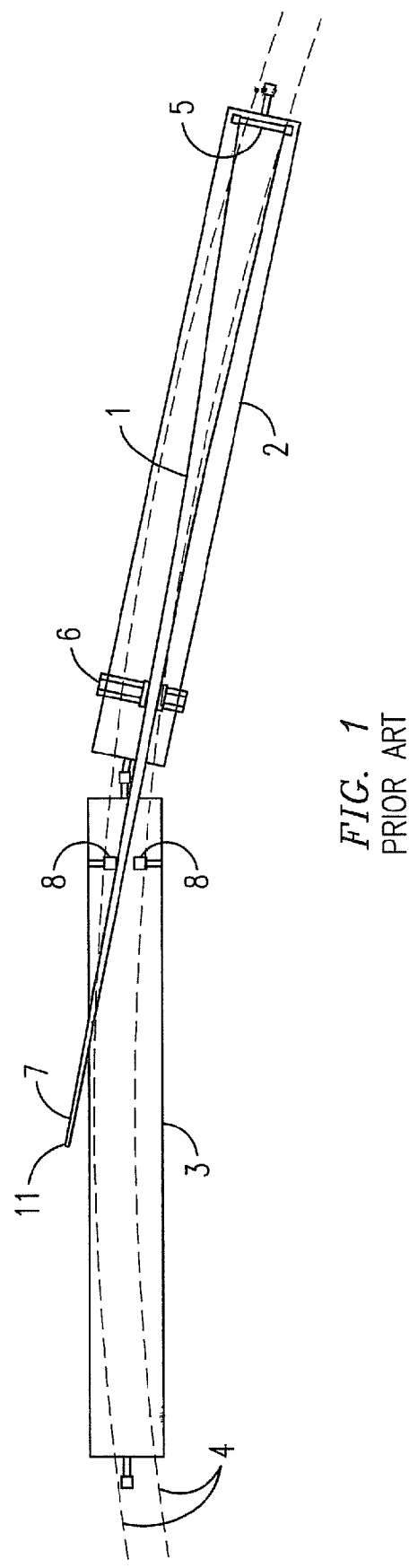
FIG. 1 is a plan view of a wind turbine blade loaded onto two railcars and rounding a curve as in the prior art.

This improvement is accomplished in the present invention by selectively bending a wind turbine blade only when the train upon which it is being transported traverses a bend in the rail line, and then, only to an extent necessary to prevent the tip of the blade from extending beyond an established lateral transportation limit. The blade is bent along its most flexible region extending from the tip end toward the center of gravity of the blade. Bending occurs when the tip end of the blade moves laterally outward away from the side of the rail car as the train enters the bend (as occurs with the prior art arrangement shown in FIG. 1) and then makes contact with a vertically extending bumper which is affixed to the railcar. The bumper applies a horizontal displacement limiting force to the tip end of the blade, which force is counteracted by an opposed-direction force applied by a mid-span support located along the blade length, with the resulting moment causing the blade to bend in a horizontal plane while the tip is prevented from exceeding the lateral transportation limit. The peak bending moment imposed on the blade is minimized by maximizing the distance between the bumper and the mid-span support. Advantageously, no bending force is imposed on the blade during transportation of the blade over a straight track, and the bending forces are passively applied only when the train enters a bend that is tight enough to cause the tip end to make contact with the bumper.

Figure 2:
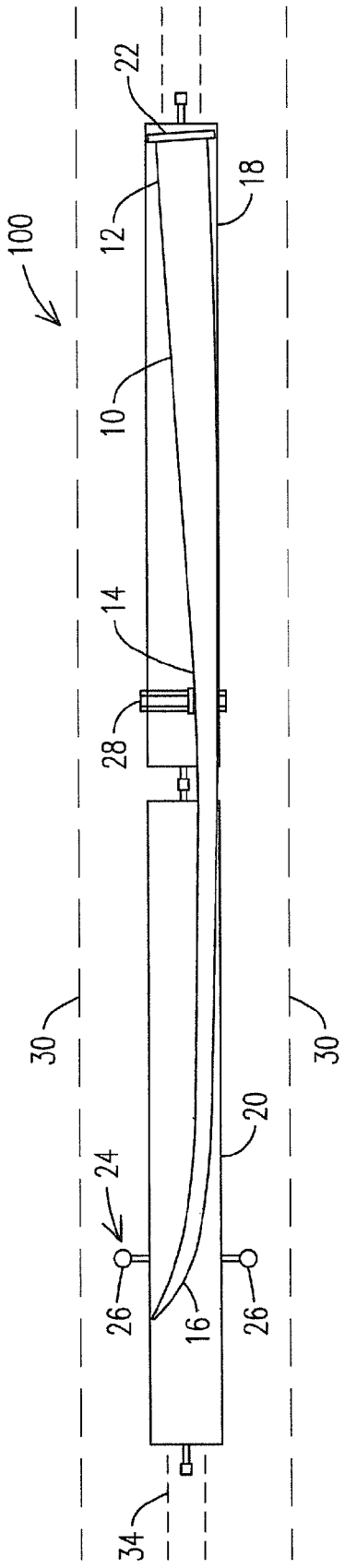
FIG. 2 is a plan view of an apparatus for transporting a curved wind turbine blade via two railcars according to an illustrative embodiment of the present invention.
Figure 3:
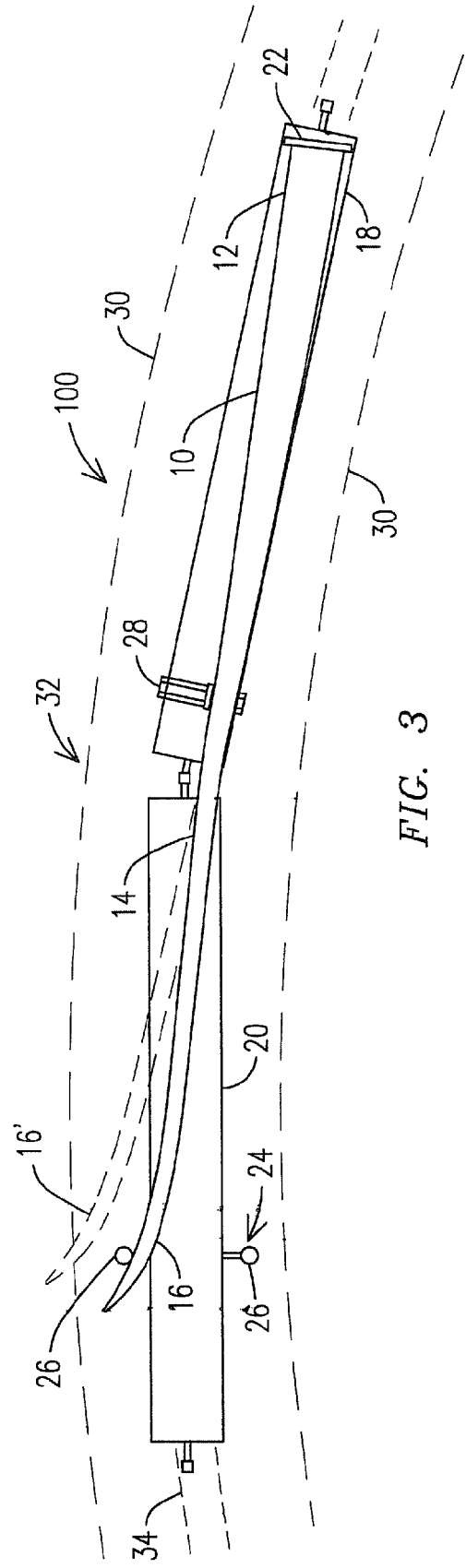
FIG. 3 is a plan view of the apparatus of FIG. 2 moving around a curve of the railroad.

An embodiment of the invention is illustrated in FIGS. 2 and 3. FIG. 2 provides a top plan view of an apparatus 100 for railroad transportation of a wind turbine blade 10 on a first railcar 18 and a second railcar 20 along a straight path of a railroad 34. FIG. 3 provides a top plan view of the embodiment of apparatus 100 of FIG. 2 wherein the blade 10 is transported around a design basis curve 32 in the railroad 34, and wherein the design basis curve 32 in the railroad 34 is in a direction opposite to the direction of a curve of the blade 10. A curve in the railroad in a direction opposite to the direction of the curve in the blade would result in a maximum amount of lateral displacement of the blade tip with a prior art arrangement as in FIG. 1. In FIGS. 2 and 3, the blade 10 includes a blade root end 12, a mid span 14, and a tip end 16. The first railcar 18 includes a blade root support 22 connected thereto. The blade root support 22 is configured to receive the blade root end 12. The blade root support 22 can be horizontally fixed, or can rotate horizontally about a vertical axis to provide rotation of the blade 10. The second railcar 20 includes a tip displacement limiter 24 which includes a vertically extending bumper 26 positioned outboard of the railcar such that the vertically extending bumper 26 may contact the blade 10 near the tip end 16. A mid span support 28 is disposed between the blade root support 22 and the tip displacement limiter 24 on the first railcar 18, although in other embodiments the mid span support may be located on the second railcar 20. The mid span support 28 is configured to receive and support the mid span 14 of the blade. In one embodiment, the mid span support may be slidably engaged to the first railcar 18, providing lateral movement of the mid span support 28 and the blade 10 on the railcar 18 to further alleviate the pressure on the blade 10 as the blade traverses a design basis curve 32 in the railroad 34. For a straight blade and for some embodiments of transporting a curved blade, the blade root support and mid span support may be centered laterally on the railcars. In the embodiment of FIGS. 2 and 3, the blade root support 22 is shifted laterally on the railcar 18 in a first direction from a centerline of the railroad, and the mid span support is shifted in a second direction opposite the first direction in order to accommodate the curve of the blade to the extent possible within the lateral confines of the railcars 18, 20.

As illustrated in FIG. 3, when the first and second railcars 18, 20 traverse the design basis curve 32 in the railroad 34, the tip displacement limiter 24 contacts the blade 10 via the vertically extending bumper 26 to provide a passive horizontal displacement limitation to the blade 10 so as to temporarily bend the blade 10 to maintain the blade 10 within the lateral transportation limit 30 as may be imposed by the railroad. During this passive horizontal displacement, the blade 10 is temporarily bent as it presses against the vertically extending bumper 26. Without the tip displacement limiter 24, the blade tip end would extend significantly beyond the lateral transportation limit 30 as shown by the unbent tip end 16' shown in phantom. In the embodiment shown in FIGS. 2 and 3, a curved blade 10 is displayed; however, the invention can also be used with straight blades.

There is some flexibility in the placement of the mid span support 28 on the railcars 18, 20. In order to ensure bending over a maximum portion of the blade 10 in order to minimize the peak stress in the blade caused by the bending, in one embodiment the mid span support 28 may be positioned on the railcar 18, 20 as close to the blade root 12 as practical, although obviously no closer to the blade root end 12 than the center of gravity of the blade 10 in order to ensure stable vertical support for the blade 10. In one embodiment the mid span support 28 may be placed at a position between the center of gravity of the blade and 60% of an axial length of the blade 10 from the root end 12. In another embodiment, the mid span support 28 can be positioned at a location that is at no more than 50% of the axial length of the blade 10 from the root end 12.

The position of the tip displacement limiter 24 along the axial length of the blade and the position of the vertically extending bumper 26 outboard of the railcar may vary, and there is a correlation between them. The closer to the tip end 16 that the tip displacement limiter 24 is placed, the further outboard from the railcar the vertically extending bumper 26 can be positioned. Likewise, the closer to the mid span support 28 the tip displacement limiter 24 is placed, the more inboard the vertically extending bumper 26 needs to be positioned, since the tip end 16 of the blade will extend laterally farther away from the railcar 20 than the bumper 26. The further away from the tip end 16 the tip displacement limiter 24 is placed, the more inboard the vertically extending bumper 26 must be placed, and the greater the stress on the blade 10 must be to keep the tip end 16 from extending beyond the lateral transportation limit 30. In a preferred embodiment, the tip displacement limiter 24 is positioned nearest the tip end 16, and the vertically extending bumper 26 is positioned outboard of the railcar just inside of the lateral transportation limit 30, such that the least amount of force can be imposed upon the blade 10 and the bending moment can be exerted along a maximum extent of the blade length.

In one embodiment, the vertically extending bumper 26 can be positioned outboard of the railcar to contact the blade at a point on the blade 10 within 10% of the axial length of the blade 10 from the tip end 16, wherein a resulting moment creates a bending of the blade and the bending is distributed across at least 25% of the blade length. In another embodiment, the vertically extending bumper 26 contacts the blade at a point on the blade within 5% of the axial length of the blade 10 from the tip end 16. In yet another embodiment, the vertically extending bumper 24 contacts the blade 10 within 2.5% from the tip end 16.

The lateral transportation limit 30 is expressed as a distance from the longitudinal centerline of the railroad, and while varies from route to route, it may typically be in the range of 13-16 feet (4-5 meters). The vertically extending bumper 26 may be supported from the railcar such that it is positioned within 2-4 feet (approximately 0.6-1.2 meters) inboard of the lateral transportation limit 30, or in another embodiment, the vertically extending bumper 26 is positioned between 1-5 feet (approximately 0.3-1.5 meters) inboard of the lateral transportation limit 30. By keeping the bumper 26 inboard of the limit, there is room for the portion of the blade tip end 16 which extends past the bumper 26 to project outward by an additional amount without violating the lateral transportation limit 30. The closer that the bumper 26 is to the very tip of the blade, the closer the bumper 26 may be to the lateral displacement limit 30. In another embodiment, the distance between the vertically extending bumper 24 and the lateral transportation limit 30 can be adjusted by manipulating the vertically extending bumper 24 prior to the transportation in order to accommodate the requirements of a particular route. While a pair of vertically extending bumpers 26 are shown in the figures, the apparatus may be used with only one vertically extending bumper 26 or more than two vertically extending bumpers 26 disposed along the railcars to limit the lateral extension of the blade 10 beyond the lateral transportation limit 30.

In one embodiment, the bending of the blade is distributed across at least a third of the blade length. In another embodiment, the bending is distributed across at least 40% of the blade length.

In one embodiment, the vertically extending bumper 26 is positioned outboard of the railcar to make contact with the blade 10 within 15 feet (approximately 4.6 meters) from the tip end 16. In another embodiment, the vertically extending bumper 26 makes contact with the blade 10 at a point within 5 feet (approximately 1.5 meters) from the tip end 16. In yet another embodiment, the vertically extending bumper 26 makes contact with the blade 10 within 3 feet (approximately 0.9 meters) from the tip end 16.

In an exemplary embodiment, with a blade length of 55 meters (approximately 180 feet), and with the bumper applying force to the blade at 1 meter (approximately 3.3 feet) of the tip, and the mid-span support located 30 meters (approximately 98.4 feet) from the tip end of the blade, thus with about 53% of the blade being subjected to the bending force, the blade tip can be deflected 1.736 meters (approximately 5.7 feet) when 5000N (approximately 1,125 pounds) of force is applied by the bumper.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for transporting a wind turbine blade over a railroad, the apparatus comprising:
   a blade root support connected to a first railcar, the blade root support configured to receive a root end of the blade, a tip displacement limiter connected to a second railcar, and a mid span support connected to one of the first or second railcars and positioned between the blade root support and the tip displacement limiter, wherein the mid span support is configured to receive a midsection of the blade; and
   wherein the tip displacement limiter comprises a vertically extending bumper positioned outboard of the railcar to contact the blade at a point on the blade within 10% of an axial length of the blade from a tip end, such that when the blade is transported around a design basis curve in the railroad, the tip displacement limiter restricts the blade tip end from extending beyond a lateral transportation limit by exerting a force on the blade which is counter to a force exerted on the blade by the mid span support, resulting in a bending of the blade only as necessary to prevent the tip end from extending beyond the lateral transportation limit.

2. The apparatus of claim 1, wherein the vertically extending bumper is positioned to contact the blade within 5% of the axial length of the blade from the tip end.

3. The apparatus of claim 1, wherein the vertically extending bumper is positioned to contact the blade within 2.5% of the axial length of the blade from the tip end.

4. The apparatus of claim 1, wherein the blade is a curved blade, and where the curve is in a horizontal plane, and wherein the blade root support is offset horizontally in a first direction from a centerline of the railroad, and the mid span support is offset horizontally in a second direction opposite the first direction.

5. The apparatus of claim 1, wherein the vertically extending bumper is positioned within 2-4 feet inboard of the lateral transportation limit.

6. The apparatus of claim 1, wherein the vertically extending bumper is positioned within 1-5 feet inboard of the lateral transportation limit.

7. An apparatus for transporting a wind turbine blade over a railroad using at least a first railcar and a second railcar, wherein the railroad imposes a lateral transportation limit, and wherein the wind turbine blade comprises a root end, a midsection and a tip end, the apparatus comprising:
   a blade root support connected to the first railcar, the blade root support configured to receive the root end of the blade,
   a mid span support positioned between a center of gravity of the blade and 60% of an axial length of the blade from the blade root end, the mid span support configured to receive the midsection of the blade; and
   a tip displacement limiter connected to the second railcar, wherein the tip displacement limiter comprises a vertically extending bumper positioned outboard of the railcar to contact the blade at a point on the blade within 10% of the axial length of the blade from the tip end, such that when the blade is transported around a design basis curve in the railroad, the tip displacement limiter restricts the blade tip end from extending beyond the lateral transportation limit by exerting a force on the blade which is counter to a force exerted on the blade by the mid span support, resulting in a bending of the blade, wherein the bending is distributed across at least 30% of the blade length.

8. The apparatus of claim 7, wherein the mid span support is positioned at a location that is at no more than 50% of the axial length of the blade from the blade root end.

9. The apparatus of claim 7, wherein the vertically extending bumper contacts the blade at a point on the blade within 5% of the axial length of the blade from the tip end.

10. The apparatus of claim 7, wherein the vertically extending bumper contacts the blade at a point on the blade within 2.5% of the axial length of the blade from the tip end.

11. The apparatus of claim 7, wherein the bending is distributed across at least 40% of the blade length.

12. The apparatus of claim 7, wherein the bending is distributed across at least 50% of the blade length.

13. The apparatus of claim 7, wherein the blade is a curved blade, and wherein the blade root support is offset horizontally in a first direction from a centerline of the railroad, and the mid span support is horizontally offset in a second direction opposite the first direction.

14. An apparatus for transporting a wind turbine blade over a railroad using at least a first railcar and a second railcar, wherein the railroad imposes a lateral transportation limit, and wherein the wind turbine blade comprises a root end, a midsection, and a tip end, the apparatus comprising:
   a blade root support connected to the first railcar, the blade root support configured to support the root end of the blade, a tip displacement limiter connected to the second railcar, and a mid span support positioned between the blade root support and the tip displacement limiter, the mid span support being configured to receive the midsection of the blade; and
   wherein the tip displacement limiter comprises a vertically extending bumper positioned outboard of the railcar to make contact with the wind turbine blade at a point within 15 feet from the tip end, such that when the blade is transported around a design basis curve in the railroad, the tip displacement limiter restricts the blade tip end from extending beyond the lateral transportation limit.

15. The apparatus of claim 14, wherein the blade is a curved blade, and wherein the blade is curved in a horizontal plane, and wherein the blade root support is offset horizontally in a first direction from a centerline of the railroad, and the mid span support is offset horizontally in a second direction opposite the first direction.

16. The apparatus of claim 14, wherein the vertically extending bumper makes contact with the blade at a point on the blade within 5 feet from the tip end.

17. The apparatus of claim 14, wherein vertically extending bumper makes contact with the blade at a point on the blade within 3 feet from the tip end.

* * * * *